Nov. 18, 1969  L. R. REID  3,478,622
MARINE TRANSMISSION
Filed Aug. 30, 1967  2 Sheets-Sheet 1
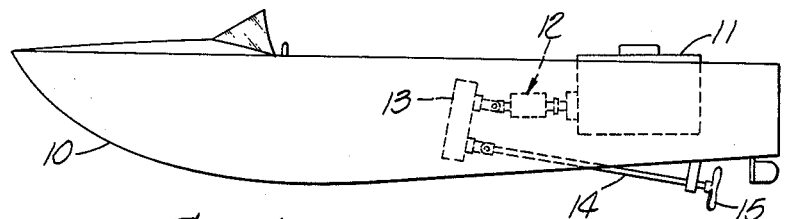
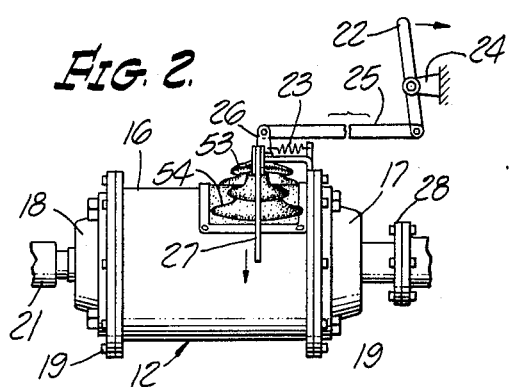
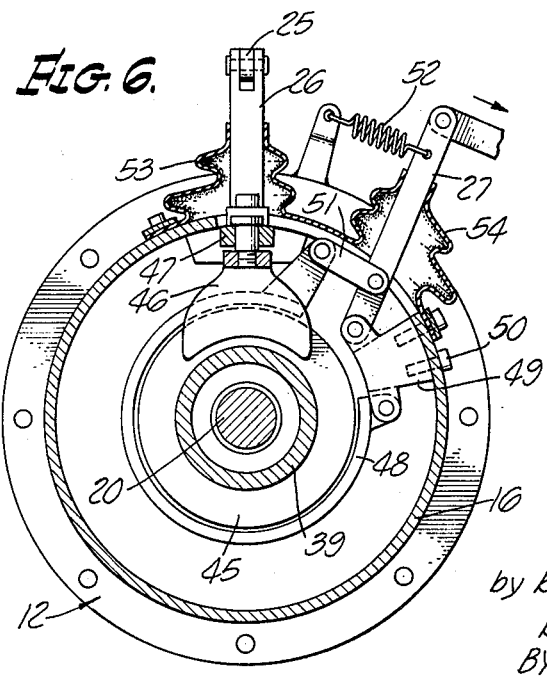
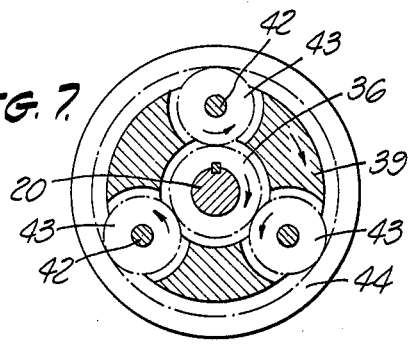
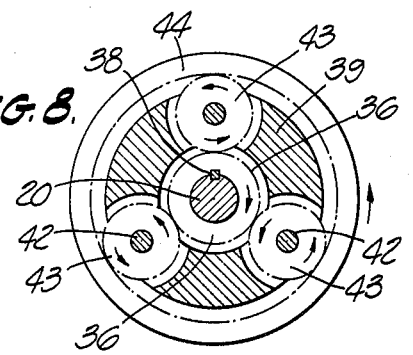
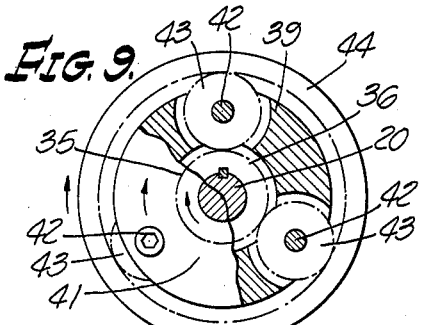
INVENTOR
LARRY R. REID, deceased,
by RICHARD D. REID, Administrator.
KENDRICK, SUBKOW and STOLZY
BY George J. Netter
ATTORNEY Nov. 18, 1969  L. R. REID  3,478,622

MARINE TRANSMISSION

Filed Aug. 30, 1967  2 Sheets-Sheet 2

INVENTOR
LARRY R. REID, deceased,
by RICHARD D. REID, Administrator.
KENDRICK, SUBKOW and STOLZY
BY George J. Hetter
ATTORNEY

United States Patent Office 3,478,622
Patented Nov. 18, 1969

3,478,622
MARINE TRANSMISSION
Larry R. Reid, deceased, late of Santa Maria, Calif., by Richard D. Reid, administrator, 420 N. Miller St., Santa Maria, Calif. 93454
Filed Aug. 30, 1967, Ser. No. 664,572
Int. Cl. F16h 57/00
U.S. Cl. 74—792  10 Claims

ABSTRACT OF THE DISCLOSURE

Transmission apparatus is coupled between the engine and the propeller of the marine vehicle in a direct manner not requiring clutching means. For producing forward drive, the planetary gears relating an input sun gear and an output ring gear are caged by moving the planetary gear system longitudinally of the input power shaft, bringing a further ring gear that is common to the planetary gears into engagement with the sun gear achieving direct driving relation between the engine and the propeller. Reverse drive is obtained by braking the caging member associated with the planetary gears while the further ring gear is disconnected from the sun gear.

---

The present invention relates generally to gearing transmissions, and, more particularly, to planetary type transmissions providing both forward and reverse drives.

BACKGROUND OF THE INVENTION

It is usual practice in power transmission systems for in-board type marine craft to utilize some sort of clutching means in the drive system between the engine and the propeller. Such clutching means are subject to excessive slippage wear due to the particular type of loading that is encountered in the powering of marine craft. For example, while a craft is moving through, say, even relatively calm water a considerable steady load is exerted on the clutching means due to the continuous retarding force of the water on the craft. Moreover, in the case where high speeds are developed and the craft may be planing so that the propeller leaves the water occasionally, which may also frequently happen during rough weather. The propeller on leaving the water immediately picks up speed due to the reduced load, and when it drops back into the water again an exceptionally severe torque is experienced at the clutching means. In both of the above conditions, slippage induced at the clutch tends to promote wear and reduce the amount of driving power available at the propeller. Of course, both of these results are undesirable.

It is therefore a primary object and aim of the present invention to provide a rotative power transmission system for marine craft eliminating the need for clutching means.

A further object of the invention is the provision of power transmission apparatus having positive forward drive that is selectively shiftable via a clutchless planetary gear system to reverse drive.

Yet another object of the invention is the provision of mechanical power transmission as in the above described objects that is of simplified construction and relatively inexpensive to manufacture.

SUMMARY OF THE INVENTION

Briefly, the invention includes a planetary gear type system in which a sun gear is affixed to a shaft directly coupled to an engine, which sun gear is comprised of two gear portions integrally related to one another and separated by an annular grooved portion. A cage member is received over the drive shaft and includes planetary gears that engage one portion of the two part sun gear in a continuous manner. A ring gear is mounted on the cage member and movable with the cage and planetary gears as a unit axially with respect to the drive shaft. An output ring gear is arranged in continuous engagement with the planetary gears and connected to the driven shaft.

For neutral or no-drive operation, the ring gear on the cage member is positioned opposite the annular groove while the planetary gears are maintained continuously in contact with the sun gear and thus the output ring gear. Since the cage is not locked, no driving force is imparted from the drive shaft to the driven shaft, and the planetary gears merely "walk around" the output ring gear.

For forward motion, the cage member, planetary gears and ring gear are moved such that the ring gear is meshed with the second portion of the sun gear serving to lock the cage and providing direct drive from the drive shaft to the driven shaft via the output ring gear.

To achieve reverse motion, the transmission apparatus is first placed in a neutral condition and then the cage member is braked which serves to transfer motion from the drive shaft via the sun gear and planetary gears to the output ring gear in a direction reverse that of the forward drive motion.

Other objects and advantages of the present invention will be apparent to those skilled in the art on reference to the following description when taken in conjunction with the accompanying drawings.

BRIEF DESCRIPTION OF THE DRAWING

FIGURE 1 is an elevational, side view of a marine craft illustrating the transmission apparatus of the invention operatively connected between the engine and the propeller through a V-type coupling.

FIGURE 2 is a perspective elevational view of the transmission apparatus of the invention.

FIGURE 6 is a sectional, end view of the transmission apparatus of the invention taken along the line 6—6 of FIGURE 3, particularly illustrating the transmission shifting actuating mechanism.

FIGURE 7 is a schmatic representation of the planetary drive system of the invention shown in neutral operation.

FIGURE 8 is a schematic representation similar to FIGURE 7 only illustrating the transmission system during reverse drive.

FIGURE 9 is a schematic representation of the transmission apparatus of the invention as in FIGURES 7 and 8 only showing the relation of the various gears during forward drive.

DESCRIPTION OF A PREFERRED EMBODIMENT

Figure 3:
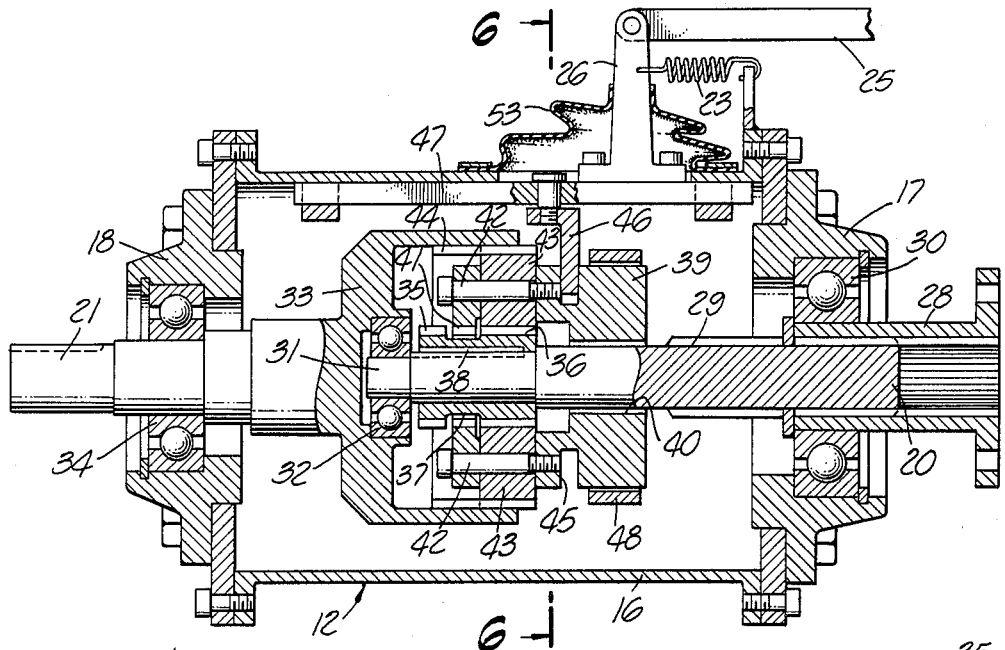
FIGURE 3 is a greatly enlarged, sectional view of the transmission apparatus of the invention showing the apparatus in the neutral power transmission state.

With reference now particularly to FIGURE 1, there is illustrated a typical marine craft 10 with an inboard engine 11 that provides power via the transmission apparatus 12 of the invention to a so-called V-type coupling 13 and thence to a drive shaft 14 and propeller 15. Although the craft 10 is indicated as a typical pleasure boat of the runabout variety, it is not meant to confine the application of the invention to that class of boat, but has been merely selected for purposes of example. Also, although a V-type coupling has been illustrated, this is merely one type of connection and the transmission apparatus of the invention is not confined in its utility to use with that type of coupling and equally effective when directly coupled with the engine and propeller.

Turning now to FIGURE 2, the transmission system 12 of the invention is seen to comprise in its major outward aspects a generally cylindrical shaped enclosure 16, the ends of which are enclosed by end bells 17 and 18 affixed to the enclosure 16 by conventional threaded bolt members 19. Power input to the apparatus is provided via shaft 20 and power output taken by the shaft 21.

Although various types and arrangements of lever systems may be found suitable for operating the transmission apparatus of this invention, the one depicted in FIGURE 2 comprises a lever arm 22 which when moved in the direction of the arrow operates the transmission 12 to produce forward drive, and is spring-loaded by coil spring 23 to return the transmission to neutral on release of the lever arm 22. More particularly, movement of the lever shifting arm 22 in the direction of the arrow operates via fulcrum 24 to move linkage arm 25, actuator 26, and internal gearing mechanism as will be particularly described later herein, to provide a direct gearing connection between the input shaft 20 and the output shaft 21.

In order to produce reverse drive, the lever arm 22 is released and allowed to assume the neutral condition as a result of the reaction force of spring 23. Then the reversing arm 27 is moved in the direction shown by the arrow, which is at right angles to that of the movement of the actuator 26, at which time and in a manner that will more fully be described later herein produces a reverse direction drive to the output shaft.

With reference now particularly to FIGURE 3, the transmission apparatus of the invention is shown in elevational sectional view taken at substantially right angles to the input-output shaft axis. The input shaft 20 is provided with a conventional shaft coupler 28 affixed in a conventional manner to the shaft by splines 29, the coupler and shaft being suitably journaled for rotative motion in the end bell 17 by bearing 30. The inner end 31 of the shaft 20 is journaled within a bearing 32 carried by a cup-shaped output member 33 mounted for unitary rotation with the output shaft 21. The latter shaft is journaled in the end bell 18 as at 34. The arrangement described immediately above insures that the shafts 20 and 21 will rotate on a common axis when engaged in a manner that will be described below for either forward or reverse drive.

Immediately adjacent the inner end 31 of the shaft 20, there is affixed onto the shaft first and second spur gears 35 and 36, spaced from one another along the shaft by an annular slot 37. The gears 35 and 36 can be secured to the shaft 20 by a key 38, for example, of conventional design such that rotation of the shaft 20 produces a corresponding rotation in the same direction of the gears 35 and 36. As particularly shown in FIGURE 3, the gears 35 and 36 are unitary with the annular slot formed therebetween. However, it is within the contemplation of the invention to provide separate gears 35 and 36 which are individually pinned, splined or keyed to the shaft.

Figure 5:
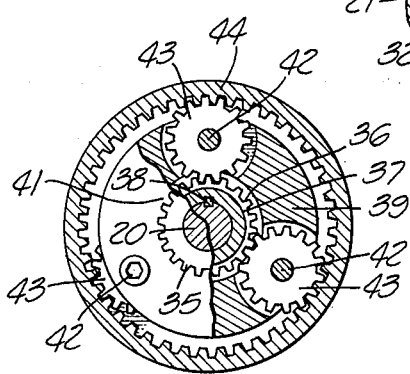
FIGURE 5 is a sectional, end view of the transmission apparatus taken along the line 5—5 of FIGURE 4 looking into the planetary gears and cage ring gear.

A generally cup-shaped caging member 39 is received onto the inner portions of the shaft 20 via an opening 40 in the base of the member, and in such manner that the sides of the cup-shaped member face toward the output end of the transmission apparatus. The opening 40 is of such dimensions relative to the outer diameter of the shaft 20 as to permit the shaft to rotate without frictional engagement with the member 39. A spur gear 41 (refer also to FIGURE 5) is mounted onto the outwardly facing edge of the cup-shaped member 39 via a plurality of threaded members 42 which also carry a corresponding plurality of planetaary gears 43 located between the ring gear and the cup-shaped member 39. The mounting is such that the planetary gears are free for rotating motion about the members 42 acting as shafts therefor. As particularly depicted here, the teeth of the planetary gears 43 as well as the inner row of teeth on the spur gear 41 are so formed such that on translation of the cup-shaped member 39 axially with respect to the input shaft 20, the gears engage gears 36 and 35, respectively. Also, as will be more fully described later, the planetary gears 43 are continuously enmeshed with the gear 36 which serves to support the cup-shaped body 39 in a spaced relation with respect to the shaft 20 so that it may rotate freely within the opening 40.

The inner end surface of the cup-shaped output member 33 is provided with an output ring gear 44, which, as shown best in FIGURE 3, is simultaneously engaged with the planetary gears 43. As will be discussed later, enmeshment of the output gear and planetaary gears is continuous irrespective of which driving connection is called for, i.e., neutral, forward or reverse.

Figure 4:
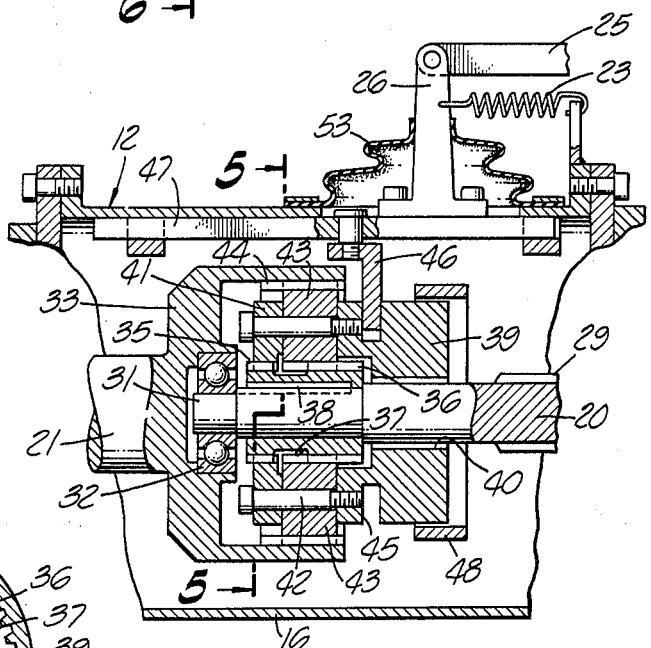
FIGURE 4 is an elevational view similar to that of FIGURE 3 only showing the transmission apparatus in forward power transmitting condition.

The cup-shaped input member 39 further includes an annular groove 45 on its circumferential periphery into which is received an L-shaped shifting arm 46. The latter is affixed to a slideplate 47 mounted adjacent an inner wall surface of the enclosure 16 for axial movement along the shaft 20 with the actuator 26. More particularly, the L-shaped arm acting on the walls of the slot 45 locates the cup-shaped member 39 and associated planetary gears and spur gear 41 along an axial path between the two extreme positions respectively illustrated in FIGURES 3 and 4. That is, as shown in FIGURE 3, the member 39 is at its rightmost toward the input and which positions the spur gear 41 immediately opposite the annular slot 37 whereby no gearing relation is achieved between the gear 41 and either of the gears 35 or 36. With the innermost position of the actuator 26 as is shown in FIGURE 4, the gear 41 is brought into engagement with gear 35 whereby driving of the shaft 20 serves to drive the gear 41 and associated planetary gears and member 39. This gearing relationship is referred to herein as "caging" of the planetary gears.

With reference now simultaneously to both FIGURES 3 and 6, the reverse shift arm 27 is seen to actuate a brake band 48 for selectively bringing the band into frictional engagement with the outer periphery fo the cup-shaped member 39 to effect reverse drive in a manner that will be more particularly set forth later. Specifically, the arm 27 has its inner extremity pivotally connected to a bracket 49 secured to the inner surface of the housing 16 by threaded members 50. One end of the brake band 48 is secured to the bracket 49 and the other end is secured via linkage 51 directly to the arm 27. Accordingly, motion of arm 27 in the direction of the arrow shown in FIGURE 6 tightens the brake band about the cup-shaped member 39 securing member 39 against rotation. Release of the arm 27 allows it to maintain the non-braking relation through the action of coil spring 52.

As is conventional in gear boxes and transmissions in general, the interior of the enclosure 16 is provided with a lubricant and the flexible seal members 53 and 54 serving to prevent leakage of the lubricant from the interior of the enclosure via either 26 or 27.

Neutral drive

With both of the arms 26 and 27 in released position, that is, the coil springs 23 and 52 are disposing the relative members as shown in FIGURES 3 and 6, the transmission system of the invention is in the neutral condition transmitting no power to the output. The schematic depiction in FIGURE 7 shows the relative motions of the various parts at this time. Accordingly, assuming that on looking into the shaft 20 from the output to the input direction that the input shaft is turning in a clockwise direction, it is seen at this time that the gear 36 drives each of the planetary gears 43 in a counterclockwise direction. However, all that is produced at this time is that the planetary gears, since they are uncaged, merely "walk around" the inside of the ring gear 44 and do not drive the gear or the output shaft 21.

Forward drive

To achieve forward drive, the lever 22 is moved in the direction of the arrow shown in FIGURE 2 which moves the arm 26, slideplate 47 and associated parts until the gears assume their leftmost position as shown in FIGURE 4. At this time, although the planetary gears 43 remain enmeshed with gear 36 as in neutral operation, the spur gear 41 is now enmeshed with the gear 35 serving to "cage" the planetary gears. With reference now particularly to FIGURE 9 and the schematic of the operation shown in FIGURE 4, with the input shaft traveling in a clockwise direction, driving of the planetary gears now produces a driving action of the output ring gear 44, causing it to rotate in a clockwise direction, i.e., in the same direction as the input shaft 20.

Reverse drive

As indicated earlier, reverse drive is achieved with the equipment first of all set in the neutral position, i.e., the actuator arm 26 at its rightmost under control of the coil spring 23. Then, arm 27 tightens the brake band 48 preventing rotation of the cup-shaped member 39. Therefore, as shown in FIGURE 8, drive of the input shaft in a clockwise direction causes the planetary gears to rotate in a counterclockwise direction and drive the output ring gear, and thus the output shaft 21 in a counterclockwise direction.

Although in the foregoing description of the invention shifting of the transmission apparatus was accomplished by manipulation of two separate lever systems, this is not meant to confine the invention in this manner and was only adopted for purposes of explanation and ease of presentation. It is considered to be fully within the spirit of the invention to provide a single lever system for shifting the subject transmission through neutral, forward and reverse power drives.

Although but one specific embodiment of the present invention has been described herein and illustrated in the acompanying drawings, many changes and modifications will suggest themselves to those skilled in the art. The particular embodiment chosen has been selected for the purpose of illustration only. The present invention should, therefore, not be limited to the embodiment so selected, the true scope of the invention being measured instead by the appended claims.

What is claimed is:

1. In rotative power transmission apparatus, the combination comprising:
   first and second aligned shafts;
   a pair of gears secured to the first shaft at mutually spaced positions for rotation therewith;
   a ring gear connected to the second shaft;
   means rotatably mounted adjacent the first shaft and translatable in a direction parallel to that of the aligned shafts and including at least one pinion gear continuously engaged with the ring gear and one of the pair of gears on the first shaft;
   a spur gear carried by the translatable means for being selectively moved into and out of engagement with the other gear on said first shaft; and
   braking means selectively actuable to brake the translatable means against rotation;
   engagement of the spur gear with the other gear on the first shaft producing a same direction rotative relation between the shafts, and braking of the translatable means with the spur gear disengaged from the other gear on the first shaft establishes reverse direction rotative relation between the shafts.

2. In rotative power transmission apparatus as in claim 1, in which the terminus of the first shaft is journaled within support means mounted on the second shaft and carrying the ring gear in such manner that the shafts are aligned throughout rotation.

3. In rotative power transmission apparatus as in claim 1, in which the translatable means includes a cup-shaped member with an opening in the bottom for receiving the first shaft therethrough, the sides of the cup-shaped member facing toward the second shaft; the pinion gear being rotatably mounted on the outwardly facing edge of the cup-shaped member.

4. In rotative power transmission apparatus as in claim 3, in which the spur gear is affixed to the cup-shaped member and disposed outwardly of the pinion gear.

5. In rotative power transmission apparatus as in claim 2, in which the support means includes wall means extending along and parallel of the first shaft, the first ring gear being mounted on said wall means encircling the first shaft.

6. In rotative power transmission apparatus as in claim 3, in which the outer surface of the cup-shaped member sides is formed into a cylindrical surface and the braking means includes a bandlike member surrounding the cylindrical surface and selectively actuatable to clampingly engage said cylindrical surface.

7. In rotative power transmission apparatus as in claim 6, in which the cylindrical surface of the cup-shaped member includes walls defining a slot circumscribing said cylindrical surface, and there being further provided an actuator arm having portions lying within said slot for translating the cup-shaped member.

8. In rotative power transmission apparatus as in claim 1, in which the pair of gears comprises spur gear means with an annular slot formed therein.

9. In rotative power transmission apparatus as in claim 1, in which there are provided means for positioning the translatable means to either of two extremes, one at which the spur gear is engaged with the other gear on the first shaft, and the other at which the spur gear is disengaged.

10. A power transmission, comprising:
    a driving shaft and a driven shaft;
    a sun gear carried by the driving shaft;
    a first sleeve member affixed to the driven shaft extending toward and in surrounding relationship to the sun gear, the sleeve including an internally toothed element located opposite the sun gear;
    at least one planetary gear interengaging the sun gear and the internally toothed element;
    a second sleeve member carrying the planetary gear and mounted for free rotation about the driving shaft;
    means for selectively securing the second sleeve member and driving shaft together to rotate as a unit producing rotation of the driven shaft in one direction; and
    means for selectively frictionally engaging the second sleeve member to prevent its rotation and thereby produce rotation of the driven shaft in a reverse direction.

References Cited

UNITED STATES PATENTS

| | | | |
|---|---|---|---|
| 793,224 | 6/1905 | Perkins | 74—792 |
| 2,349,410 | 5/1944 | De Normanville | 74—792 X |
| 2,910,893 | 11/1959 | Peras | 74—792 |
| 3,217,564 | 11/1965 | Smith | 74—792 X |

ARTHUR T. McKEON, Primary Examiner